United States Patent
Chen et al.

(10) Patent No.: US 11,657,273 B2
(45) Date of Patent: May 23, 2023

(54) HARDWARE STRUCTURE AWARE ADAPTIVE LEARNING BASED POWER MODELING METHOD AND SYSTEM

(71) Applicant: INDUSTRIAL TECHNOLOGY RESEARCH INSTITUTE, Hsinchu (TW)

(72) Inventors: Yao-Hua Chen, Fangyuan Township (TW); Jing-Jia Liou, Hsinchu (TW); Chih-Tsun Huang, Hsinchu (TW); Juin-Ming Lu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 654 days.

(21) Appl. No.: 16/728,341

(22) Filed: Dec. 27, 2019

(65) Prior Publication Data
US 2021/0201127 A1 Jul. 1, 2021

(51) Int. Cl.
*G06N 3/08* (2023.01)
*G06N 3/049* (2023.01)
*G06N 3/044* (2023.01)

(52) U.S. Cl.
CPC .............. *G06N 3/08* (2013.01); *G06N 3/044* (2023.01); *G06N 3/049* (2013.01)

(58) Field of Classification Search
CPC ........ G06N 3/08; G06N 3/0445; G06N 3/049; G06N 3/0454; G06N 3/082; G06F 2119/06; G06F 30/27; G06F 30/367; G06F 30/3308
See application file for complete search history.

(56) References Cited

U.S. PATENT DOCUMENTS 6,810,482 B1 * 10/2004 Saxena ................ G06F 30/33
713/320
8,122,398 B2 2/2012 Veller et al.
(Continued)

FOREIGN PATENT DOCUMENTS

| CN | 104036451 B | 12/2018 |
| TW | 201640272 A | 11/2016 |
| TW | 201933359 A | 8/2019 |

OTHER PUBLICATIONS

He et al., "Temporal Convolutional Networks for Anomaly Detection in Time Series", published Jun. 2019 (Year: 2019).*
(Continued)

*Primary Examiner* — Aaron W Carter
(74) *Attorney, Agent, or Firm* — Birch, Stewart, Kolasch & Birch, LLP (57) ABSTRACT

An adaptive learning power modeling method includes: sampling at least one of a plurality of network components to form a power consumption evaluation network according to at least one parameter within a parameter range; evaluating a predictive power consumption of a to-be-measured circuit by the power consumption evaluation network; training and evaluating an actual power consumption and the predictive power consumption of the to-be-measured circuit by the power consumption evaluation network to obtain an evaluation result; and performing training according to the evaluation result to determine whether to change the power consumption evaluation network.

20 Claims, 8 Drawing Sheets

(56) References Cited

U.S. PATENT DOCUMENTS

| | | | | |
|---|---|---|---|---|
| 8,495,538 | B1* | 7/2013 | Frost | G06F 30/367 |
| | | | | 716/139 |
| 8,874,943 | B2* | 10/2014 | Majumdar | G06F 11/3409 |
| | | | | 713/340 |
| 9,152,168 | B2* | 10/2015 | Bickford | G06F 1/32 |
| 9,170,912 | B1 | 10/2015 | Hu et al. | |
| 9,874,923 | B1 | 1/2018 | Brown et al. | |
| 10,146,286 | B2 | 12/2018 | Lee et al. | |
| 10,412,331 | B2* | 9/2019 | Chen | H04N 23/65 |
| 11,397,685 | B1* | 7/2022 | Ishii | G06F 12/0864 |
| 2006/0080076 | A1 | 4/2006 | Lahiri et al. | |
| 2012/0144216 | A1 | 6/2012 | Hsieh et al. | |
| 2013/0124885 | A1 | 5/2013 | Davis et al. | |
| 2014/0107999 | A1 | 4/2014 | Frenkil | |
| 2015/0067634 | A1 | 3/2015 | Huilgol | |
| 2015/0095010 | A1 | 4/2015 | Brock et al. | |
| 2016/0149780 | A1* | 5/2016 | Hsu | G06F 30/3312 |
| | | | | 370/252 |
| 2016/0187961 | A1* | 6/2016 | Elibol | G06F 9/54 |
| | | | | 345/173 |
| 2019/0068904 | A1* | 2/2019 | Chen | H04N 5/3698 |
| 2020/0313434 | A1* | 10/2020 | Khanna | H02J 3/14 |
| 2021/0201127 | A1* | 7/2021 | Chen | G06N 3/08 |
| 2022/0100624 | A1* | 3/2022 | He | G06F 11/2263 |
| 2022/0138496 | A1* | 5/2022 | Wang | G06K 9/6256 |
| | | | | 382/159 |
| 2022/0237437 | A1* | 7/2022 | Al-Marzouqi | G06N 3/0481 |

OTHER PUBLICATIONS

Ahujal et al., "Power Estimation Methodology for a High-Level Synthesis Framework," 10th International Symposium on Quality Electronic Design, 2009, pp. 541-546.

Atitallah et al., "MPSoC Power Estimation Framework at Transaction Level Modeling," IEEE ICM, Dec. 2007, 4 pages.

Chandoke et al., "A Novel Approach to Estimate Power Consumption using SystemC Transaction Level Modelling," IEEE INDICON, 2015, pp. 1-6.

Lebreton et al., "Power Modeling in SystemC at Transaction Level, Application to a DVFS Architecture," IEEE Computer Society Annual Symposium on VLSI, 2008, pp. 463-466.

Lee et al., "Dynamic Power and Performance Back-Annotation for Fast and Accurate Functional Hardware Simulation," Design, Automation & Test in Europe Conference & Exhibition, 2015, pp. 1126-1131.

Lee et al., "Learning-Based, Fine-Grain Power Modeling of System-Level Hardware IPs," ACM Transactions on Design Automation of Electronic Systems, vol. 23, No. 4, Article 30, Feb. 2018, pp. 1-25.

Lee et al., "Power ViP: SoC Power Estimation Framework at Transaction Level," IEEE, 5D-4, 2006, pp. 551-558.

Mbarek et al., "Power-Aware Wrappers for Transaction-Level Virtual Prototypes: a Black Box Based Approach," 26th International Conference on VLSI Design and the 12th International Conference on Embedded Systems, 2013, pp. 239-244.

The Taiwanese Office Action and Search Report for Taiwanese Application No. 109100589, dated Jan. 22, 2021.

\* cited by examiner

HARDWARE STRUCTURE AWARE ADAPTIVE LEARNING BASED POWER MODELING METHOD AND SYSTEM

TECHNICAL FIELD

The disclosure relates in general to an adaptive learning power modeling method and system based on hardware structure sensing.

BACKGROUND

Currently, power consumption and overheating are critical issues faced by the chip designers and the manufacturers of smart handheld devices. To resolve the problem of power consumption, various aspects including architecture, software, hardware, silicon intellectual property, and wafer manufacturing need to be considered.

In terms of the current trend in the industries, the focus of the design of electronic system level (ESL) is directed towards power consumption. For example, the design of "electronic system level" can be used as a tool for optimizing system power consumption. Besides, standard interface for the system power consumption model has been provided to increase industry demand.

Let the performance, power and area (PPA) optimization be taken for example. Given that the performance is met, the overall efficiency of the chip can be increased to minimize the requirements of power and area.

SUMMARY

According to one embodiment, an adaptive learning power modeling method is provided. The method includes: sampling at least one of a plurality of network components to form a power consumption evaluation network according to at least one parameter within a parameter range; evaluating a predictive power consumption of a to-be-measured circuit by the power consumption evaluation network; training and evaluating an actual power consumption and the predictive power consumption of the to-be-measured circuit to obtain an evaluation result; and performing training according to the evaluation result to determine whether to change the power consumption evaluation network.

According to another embodiment, an adaptive learning power modeling system is provided to evaluate a predictive power consumption of a to-be-measured circuit. The adaptive learning power modeling system includes a controller. The controller is configured to: sample at least one of a plurality of network components to form a power consumption evaluation network according to at least one parameter within a parameter range; evaluate the predictive power consumption of the to-be-measured circuit by the power consumption evaluation network; train and evaluate an actual power consumption and the predictive power consumption of the to-be-measured circuit to obtain an evaluation result; and perform training according to the evaluation result to determine whether to change the power consumption evaluation network.

DETAILED DESCRIPTION OF THE EMBODIMENTS

Technical terms are used in the specification with reference to generally-known terminologies used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all of the technical features of any embodiment of the present disclosure.

Figure 1:
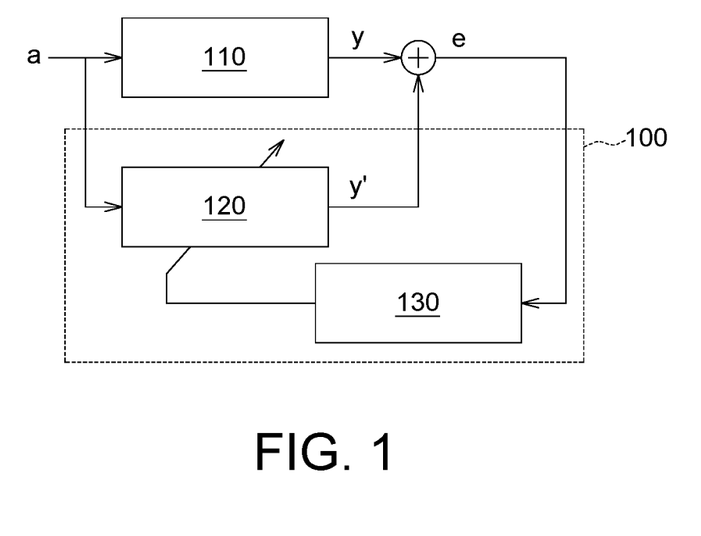
FIG. 1 is a schematic diagram of an adaptive learning power modeling system based on hardware structure sensing according to an embodiment of the present disclosure.

FIG. 1 is a schematic diagram of an adaptive learning power modeling system 100 based on hardware structure sensing according to an embodiment of the present disclosure. As indicated in FIG. 1, the adaptive learning power modeling system 100 can estimate a power consumption of a to-be-measured circuit 110. The adaptive learning power modeling system 100 includes a circuit power consumption mathematic model 120 and an adaptive online adjustment unit 130. In an embodiment of the present disclosure, actual internal architecture of the to-be-measured circuit 110 is unknown. The circuit power consumption mathematic model 120 and the adaptive online adjustment unit 130 can be realized by a controller.

The circuit power consumption mathematic model 120 is configured to estimate the power consumption of the to-be-measured circuit 110. The adaptive online adjustment unit 130 is configured to adjust the circuit power consumption mathematic model 120, such that the circuit power consumption mathematic model 120 can estimate the power consumption more accurately and can decrease the complexity of the circuit power consumption mathematic model 120.

In an embodiment of the present disclosure as indicated in FIG. 1, designation a represents an input signal; designation y represents an actual power consumption of a to-be-measured circuit 110; designation y' represents an estimated power consumption of the circuit power consumption mathematic model 120; designation e (e=y-y') represents an error between the actual power consumption y of the to-be-measured circuit 110 and the estimated power consumption y' of the circuit power consumption mathematic model 120. The actual power consumption is obtained through measurement, and the estimated power consumption is obtained through prediction. The adaptive online adjustment unit 130 adjusts the circuit power consumption mathematic model 120 according to the error e, such that the circuit power consumption mathematic model 120 can estimate the power consumption more accurately and can decrease the complexity of the circuit power consumption mathematic model 120.

Figure 2:
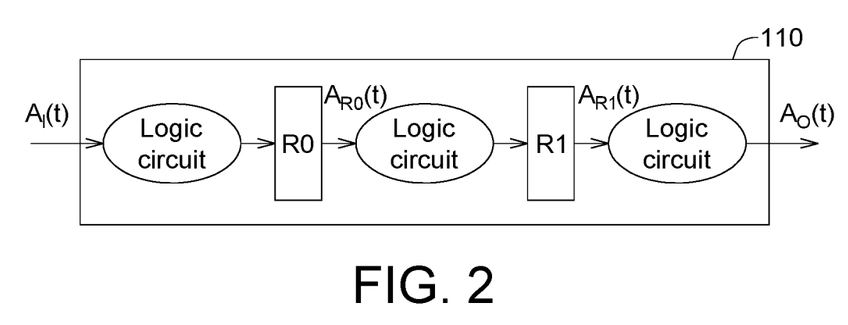
FIG. 2 is a predictive model for the internal architecture of the to-be-measured circuit according to an embodiment of the present disclosure.

FIG. 2 is a predictive model for the internal architecture of the to-be-measured circuit 110 according to an embodiment of the present disclosure. As indicated in FIG. 2, since actual internal architecture of the to-be-measured circuit 110 is unknown, in an embodiment of the present disclosure, the predictive model for the internal architecture of the to-be-measured circuit 110 is based on the architecture and the concepts of FIG. 2. Let FIG. 2 be taken for example. The predictive model for the internal architecture of the to-be-measured circuit 110 includes a plurality of logic circuits and a plurality of internal registers R0 and R1. However, the present disclosure is not limited thereto.

In terms of the predictive model of FIG. 2, the power consumption P1 ($t$) of the to-be-measured circuit 110 can be expressed as: P1 ($t$)=F_1 (A_I (t), A_R0 ($t$), A_R1 ($t$), A_O (t)), wherein, A_I (t) represents an input signal; A_R0 ($t$) represents an output signal of the internal registers R0; A_R1 ($t$) represents an output signal of the internal registers R1, and A_O (t) represents an output signal.

If internal registers R0 and R1 are excluded from the predictive model of FIG. 2, then the power consumption P2 ($t$) of the to-be-measured circuit 110 can be expressed as: P2 ($t$)=F_2 (A_I (t), A_I (t−1), A_I (t−2), . . . , A_I (t-m), A_O (t)), wherein, m represents a time interval relative to past input signal A_I (t-m) of the input signal A_I (t). Since the power estimation of the to-be-measured circuit 110 is relevant to the input signal and the output signal only, but not the internal registers R0 and R1, the power estimation of the to-be-measured circuit 110 can be regarded as the input signal sequentially transmitted to the output stage within the to-be-measured circuit 110. Therefore, the power consumption P2 ($t$) of the to-be-measured circuit 110 is relevant to A_I (t−1), A_I (t−2), A_I (t-m).

Figure 3:
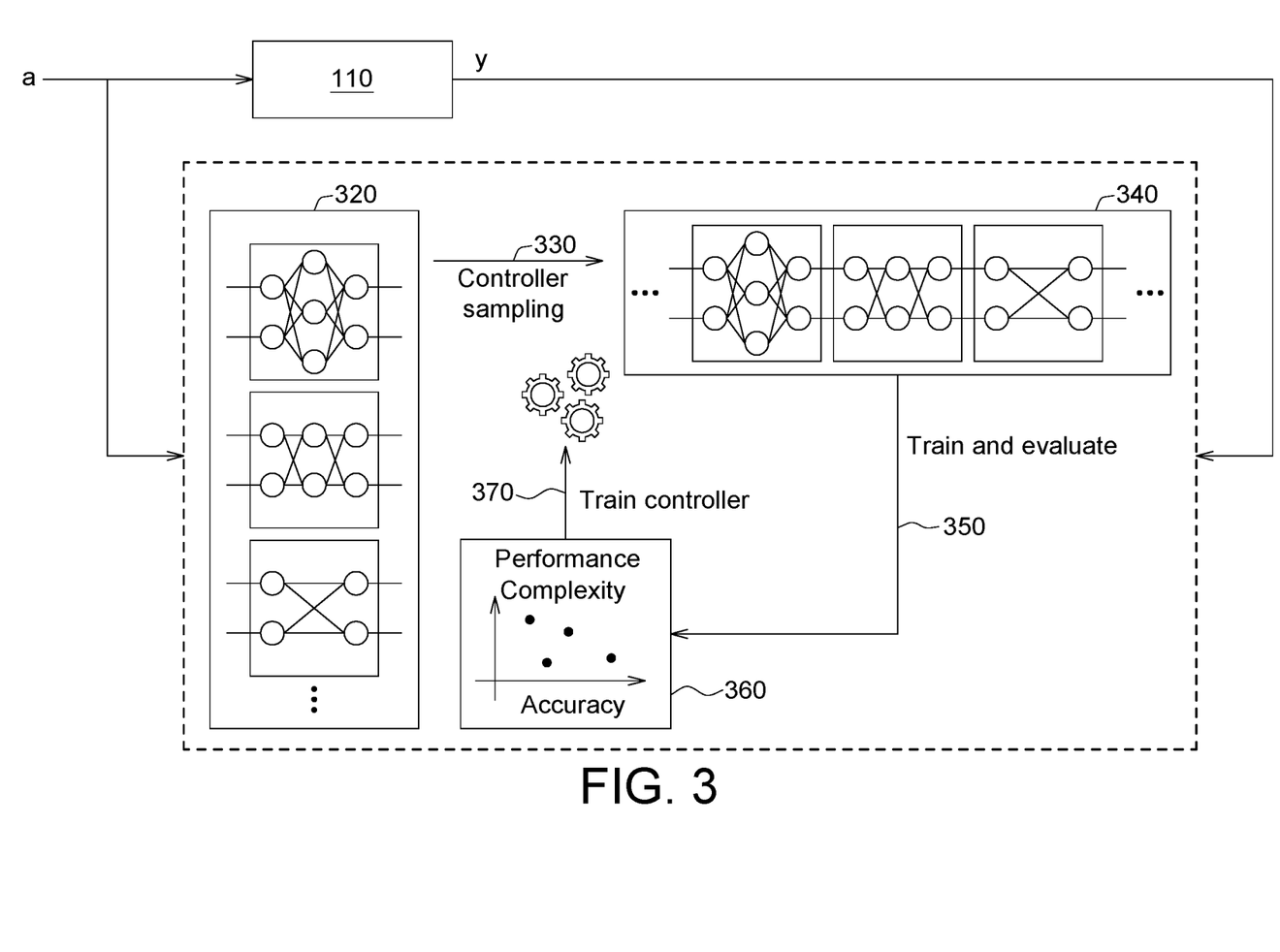
FIG. 3 is a schematic diagram of an adaptive learning power modeling method based on hardware structure sensing according to another embodiment of the present disclosure.

FIG. 3 is a schematic diagram of an adaptive learning power modeling method 310 based on hardware structure sensing according to another embodiment of the present disclosure. Refer to FIG. 3. In step 330, at least one of a plurality of network components 320 is sampled by the controller (not illustrated) according to at least one parameter within the parameter range (the parameter range can be input, specified or changed by the user) to form a "power consumption evaluation network" 340 (that is, the circuit power consumption mathematic model 120 of FIG. 1). In step 350, the power consumption evaluation network 340 is used to estimate the predictive power consumption y' of the to-be-measured circuit 110, and to train and estimate the actual power consumption of the to-be-measured circuit 110 and the predictive power consumption obtained through estimation to obtain an evaluation result 360. The evaluation result 360 includes accuracy (that is, the error between the actual power consumption and the predictive power consumption) and complexity (refers to the model complexity of the power consumption evaluation network 340). In step 370, controller training is performed by the controller (not illustrated) according to the evaluation result 360, that is, the, the controller performs training according to the error between the actual power consumption and the predictive power consumption (refers to the model complexity of the power consumption evaluation network). If no tradeoff between accuracy and complexity cannot be obtained, or, the accuracy has not reached standard, or, the complexity has not reached standard, then the method proceeds to step 330 to form another power consumption evaluation network 340 (for example, another power consumption evaluation network 340 is formed by changing the parameter or by selecting other network components from the network components 320), or, to determine whether to change the power consumption evaluation network 340 according to the evaluation result 360. Thus, the predictive power consumption of the to-be-measured circuit 110 can be evaluated, and accuracy and complexity can both be achieved.

In an embodiment of the present disclosure, the network components 320 is stored in a non-transitory computer readable medium (such as a disc, hard drive, solid state drive, or memory but is not limited thereto) from which at least one of the network components 320 is read or sampled by the controller (not illustrated, formed of hardware, software or firmware) to form the "power consumption evaluation network" 340.

Details of step 330 (some of the network components 320 are selected to form the power consumption evaluation network 340) according to an embodiment of the present disclosure are disclosed below.

Figure 4A:
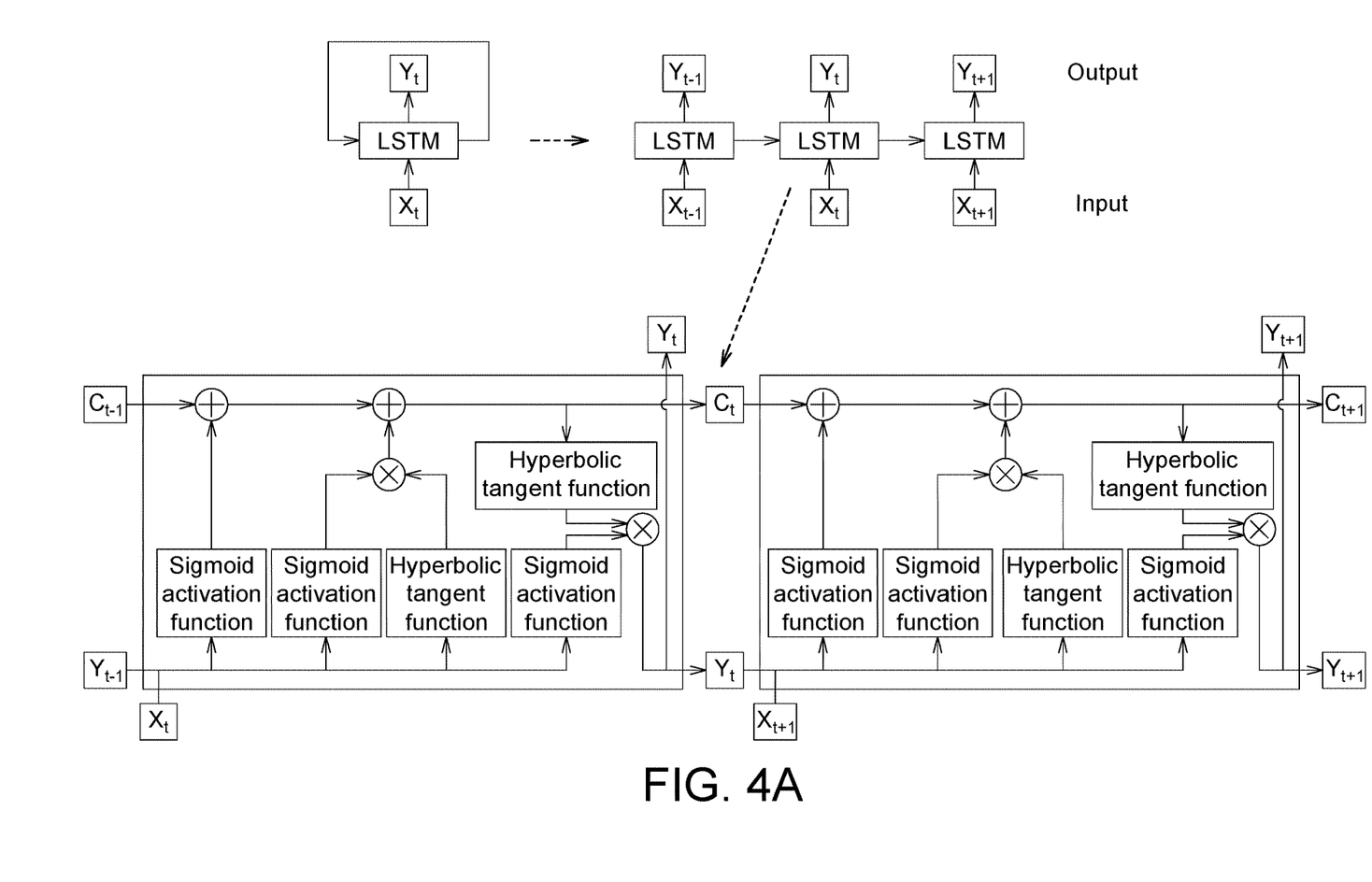
FIGS. 4A-4D are candidate network components of candidate power consumption evaluation networks that can be used in an embodiment of the present disclosure.

FIGS. 4A-4D are candidate network components of candidate power consumption evaluation networks that can be used in an embodiment of the present disclosure. FIG. 4A is a long-short term memory (LSTM) network. The LSTM network is a recurrent neural network (RNN) suitable for processing and predicting long interval and long delay events in a time series. The main feature of the LSTM network is controlling signal activation level using the sigmoid activation function and the tan h (hyperbolic tangent function) activation function to.

Figure 4B:
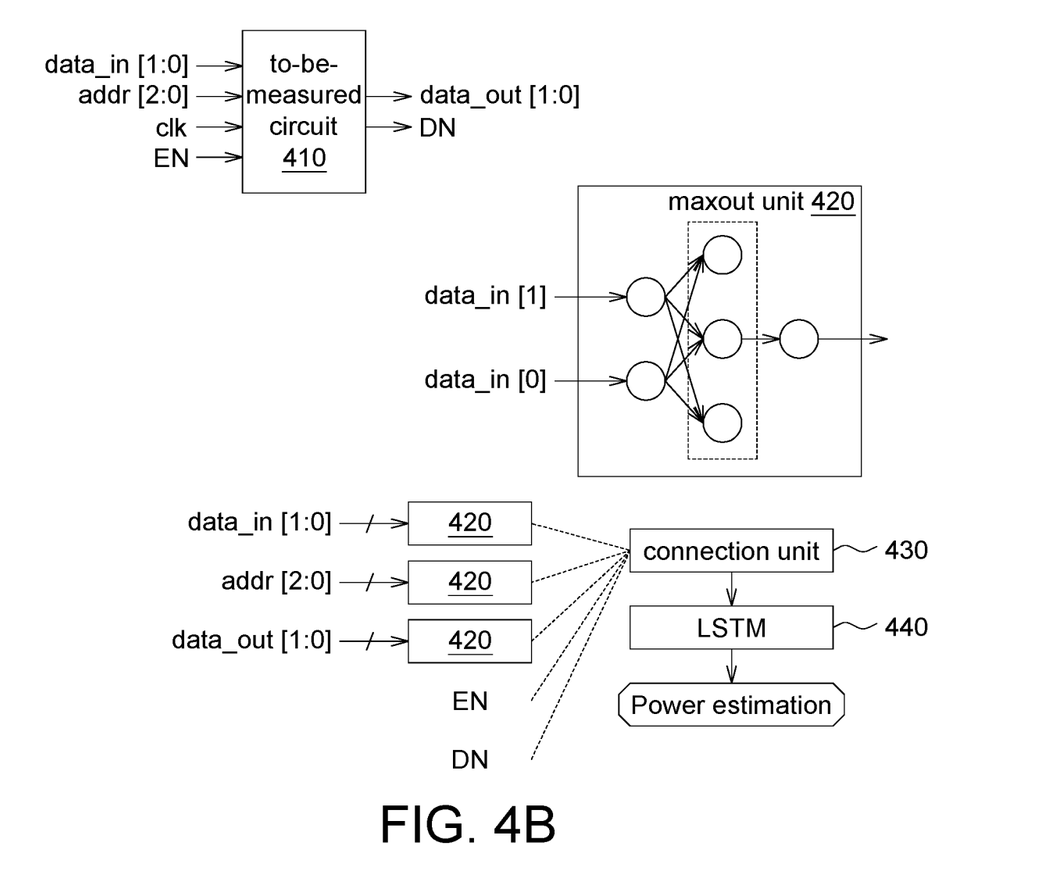

FIG. 4B is a network composed of a long-short term memory (LSTM) and a maxout unit. The main purpose of the maxout unit is for reducing the number of input signals to decrease the computational complexity in power estimation. As indicated in FIG. 4B, the input signal of the to-be-measured circuit 410 includes a 2-bit input data data_in[1:0], a 3-bit address signal address[2:0], a 1-bit clock signal clk and a 1-bit enable signal EN; and the output signal of the to-be-measured circuit includes a 2-bit output data data_out[1:0] and a 1-bit completion signal DN. The architecture of the maxout unit 420 is indicated in FIG. 4B. When simulating or estimating the predictive power consumption of the to-be-measured circuit 410, the 2-bit input data data_in[1:0], the 3-bit address signal address[2:0] and the 2-bit output data data_out[1:0] are respectively inputted to the 3 maxout units 420 as indicated at the bottom of FIG. 4B, and the output of the 3 maxout units 420, that is, a 1-bit enable signal EN and a 1-bit completion signal DN, are inputted to the connection unit 430 and the LSTM network 440 to estimate the predictive power consumption of the to-be-measured circuit 410. The main function of the connection unit 430 is for combining multiple data into one data.

Figure 4C:
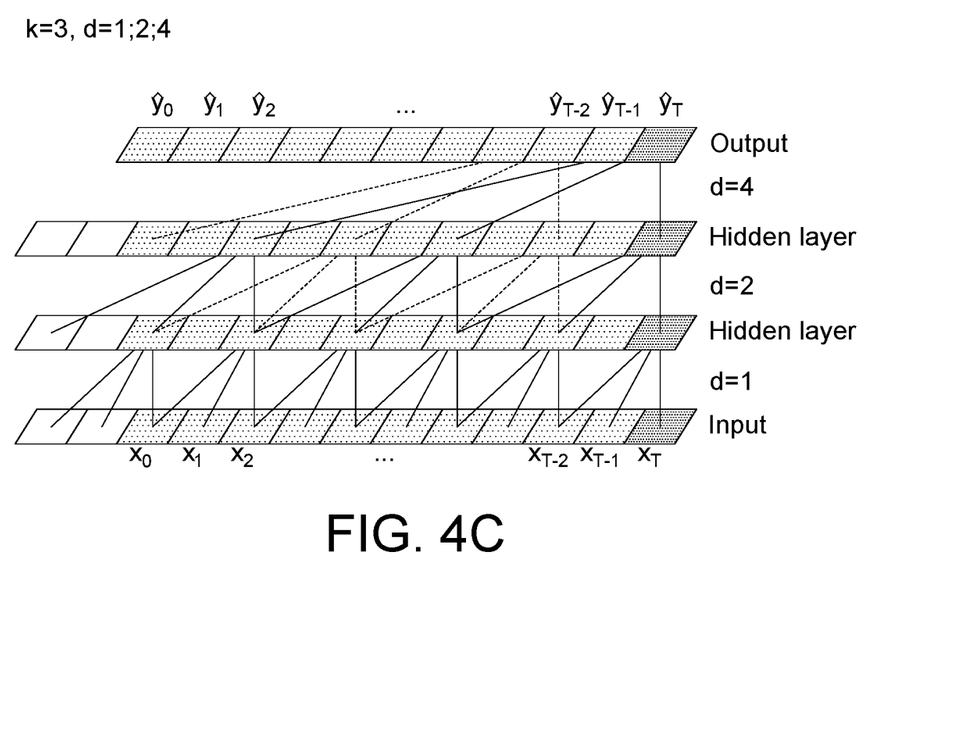

FIG. 4C is a schematic diagram of a dilated causal convolution network. In FIG. 4C, the value of dilation factor d=1, 2 and 4; the value of filter size k=3; x represents network input; y' represents network output. That is, in step 320, if the value of parameter d=1, 2, and 4; the value of parameter k=3, and the network is a dilated causal convolution network, then the circuit power consumption mathematic model 120 of FIG. 1 is as indicated in FIG. 4C.

Figure 4D:
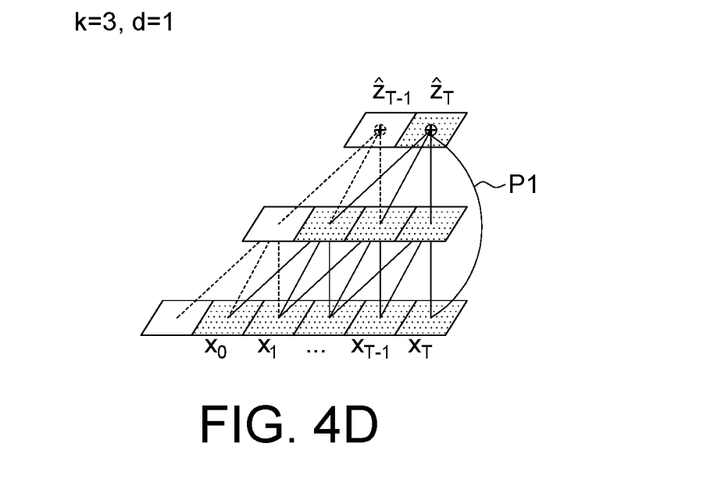

FIG. 4D is a schematic diagram of a temporal convolution network (TCN). In FIG. 4D, the value of parameter k=3; the value of parameter d=1. In FIG. 4D, the lines P1 represent identity mapping, and remaining lines represent filters.

In terms of FIG. 4C and FIG. 4D, when selecting the network components, the composition of each layer (the arrangement of filters, for example, 3*3 arrangement; the number of dimensions of the input signal; the number of input/output channels required) can be selected, and the number of layers to be created can be changed or selected. Also, the connection between different layers can be changed or selected. Whether residual connection should be created between layers can also be changed or selected. That is, the above parameters can all be regarded as compositions of network components.

However, the present disclosure is not limited to the network components of power consumption evaluation network of FIGS. 4A~4D. In other possible embodiments of the present disclosure, the power consumption evaluation network can have different modes of network components, and are still within the spirit of the present disclosure.

In an embodiment of the present disclosure, examples of the network components 320 of FIG. 3 include the network components of the LSTM network of FIG. 4A, the network components of the network composed of the long-short term memory (LSTM) and the maxout unit of FIG. 4B, the network components of the dilated causal convolution network of FIG. 4C, and the network components of the temporal convolution network.

Moreover, in an embodiment of the present disclosure exemplified by FIG. 4C, another dilated causal convolution (that is, another power consumption evaluation network 340) can be formed by changing the parameters (for example, changing parameter d or parameter k).

Figure 5A:
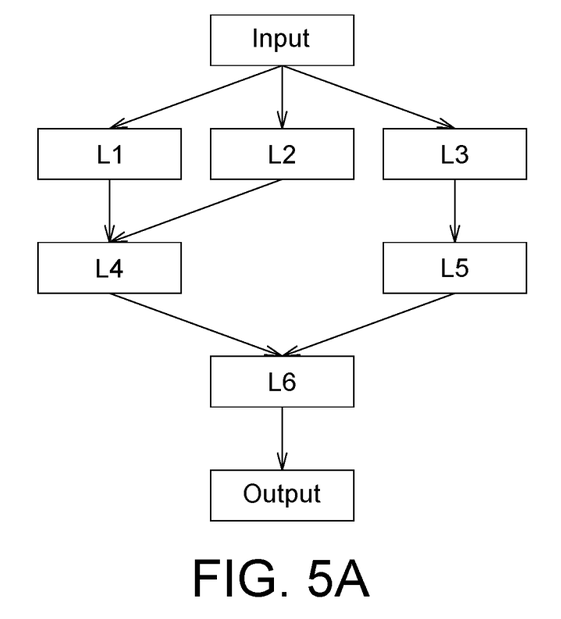
FIGS. 5A-5C are schematic diagrams of a plurality of power consumption evaluation networks according to an embodiment of the present disclosure.
Figure 5B:
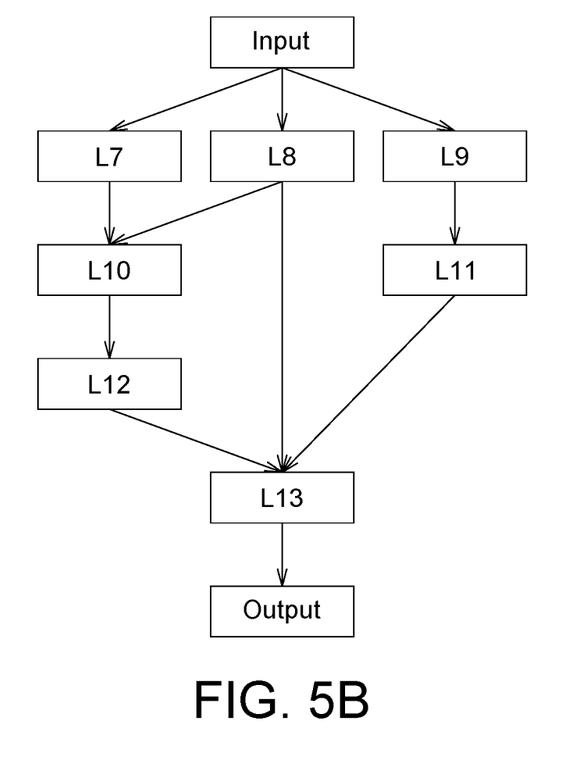
Figure 5C:
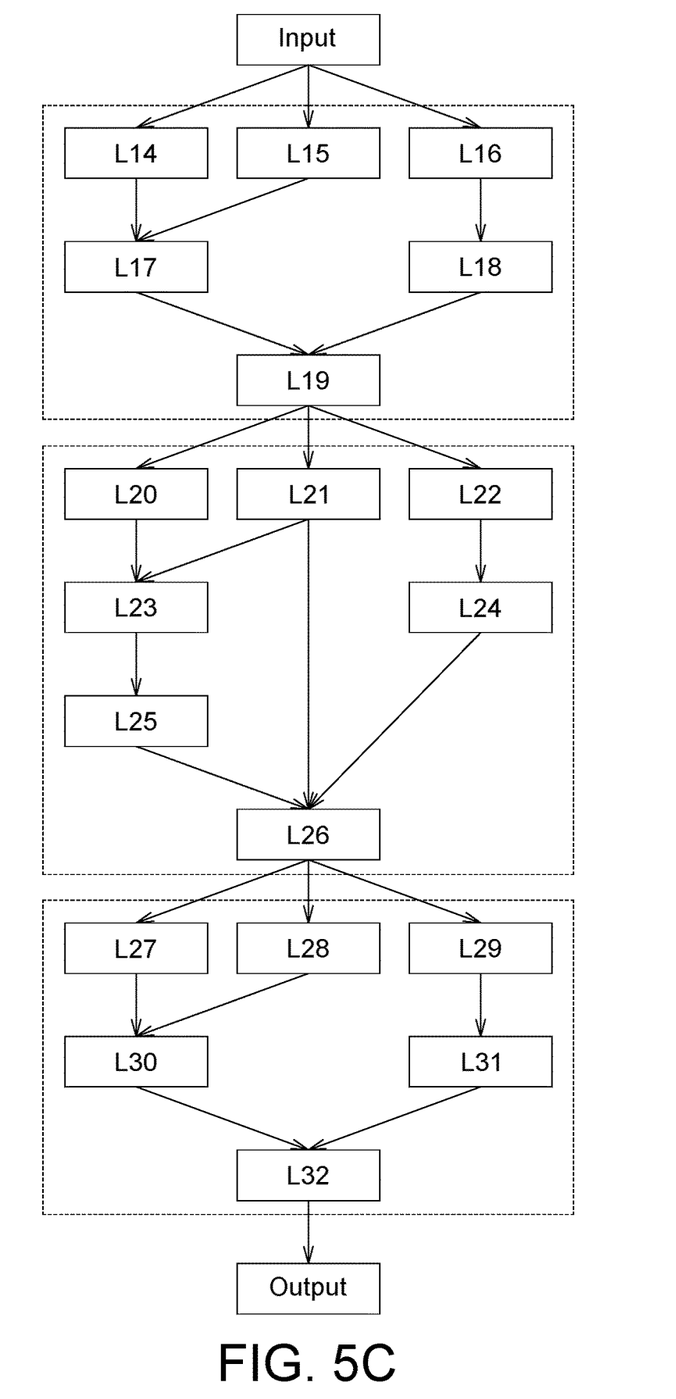

FIGS. 5A~5C are schematic diagrams of a plurality of power consumption evaluation networks according to an embodiment of the present disclosure. As indicated in FIG. 5A, the power consumption evaluation network includes layers L1-L6. As indicated in FIG. 5B, the power consumption evaluation network includes layers L7-L13. As indicated in FIG. 5C, the power consumption evaluation network includes layers L14-L32. In previous calculation, the power consumption can be evaluated by the power consumption evaluation network of FIG. 5A, but the result is not satisfactory. Therefore, in the next calculation, the parameters are changed such that the power consumption evaluation network changes to the power consumption evaluation network of FIG. 5B or FIG. 5C. In FIGS. 5A~5C, each of the layers L1-L32 can be any network component of FIGS. 4A~4D. However, the present disclosure is not limited to the power consumption evaluation network of FIGS. 5A~5C. In other possible embodiments of the present disclosure, the power consumption evaluation network can have different modes, and are still within the spirit of the present disclosure.

In an embodiment of the present disclosure, the input signal of the to-be-measured circuit and the corresponding output power can be obtained by the circuit power consumption mathematic model 120 (the power consumption evaluation network 340) through inference. Besides, the algorithms used in the circuit power consumption mathematic model 120 (the power consumption evaluation network 340), such as the LSTM algorithm, the gated recurrent units (GRU) algorithm, and the temporal convolution network (TCN) algorithm, can predict the output corresponding to the relevant signal inputted in the time series. When providing an input signal, the above algorithms can estimate the output power of the to-be-measured circuit. In an embodiment of the present disclosure, the above algorithms can adjust the circuit power consumption mathematic model 120 (the power consumption evaluation network 340) according to the circuit complexity.

Figure 6:
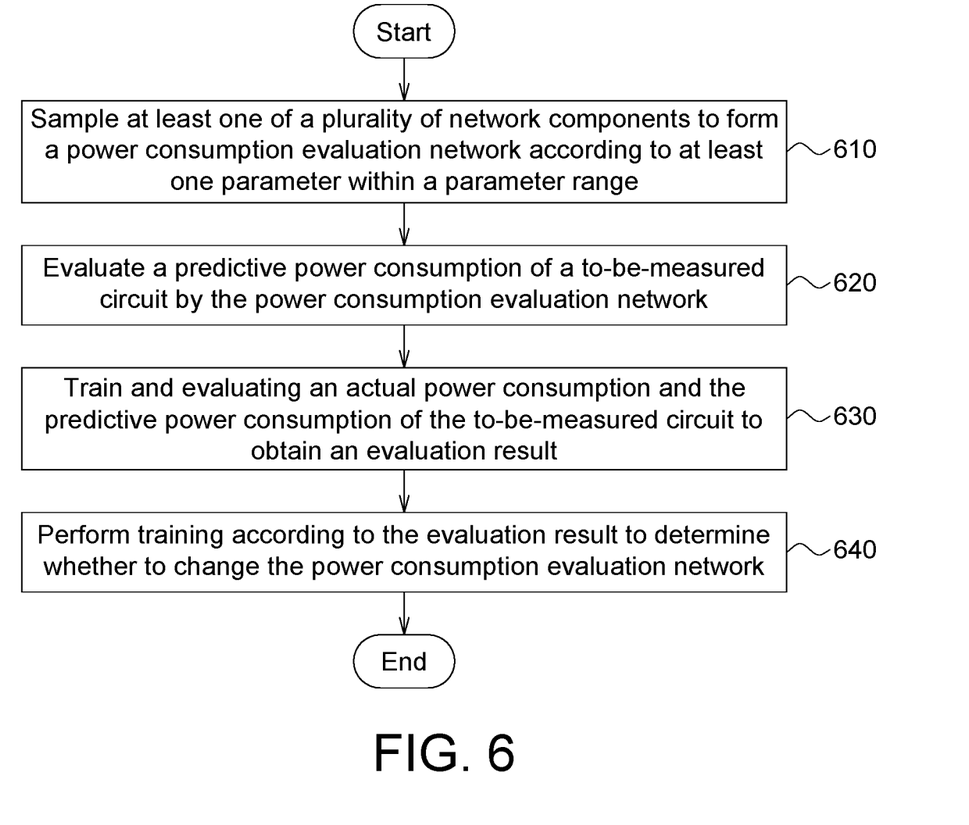
FIG. 6 is a flowchart of an adaptive learning power modeling method according to an embodiment of the present disclosure.

FIG. 6 is an adaptive learning power modeling method according to an embodiment of the present disclosure. The method includes: (610) sampling at least one of a plurality of network components according to at least one parameter within a parameter range to form a power consumption evaluation network; (620) evaluating a predictive power consumption of a to-be-measured circuit by the power consumption evaluation network; (630) training and evaluating an actual power consumption of the to-be-measured circuit and the predictive power consumption to obtain an evaluation result; and (640) performing training according to the evaluation result to determine whether to change the power consumption evaluation network.

In an embodiment of the present disclosure, even when the actual internal circuit architecture of the to-be-measured circuit is unknown, the predictive power consumption of the to-be-measured circuit still can be effectively estimated by the circuit power consumption mathematic model (or power consumption evaluation network). Moreover, in an embodiment of the present disclosure, the circuit power consumption mathematic model (or power consumption evaluation network) can achieve balance between accuracy and complexity.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An adaptive learning power modeling method, comprising:
  sampling at least one of a plurality of network components to form a power consumption evaluation network according to at least one parameter within a parameter range;
  evaluating a predictive power consumption of a to-be-measured circuit by the power consumption evaluation network;
  training and evaluating an actual power consumption and the predictive power consumption of the to-be-measured circuit to obtain an evaluation result; and
  performing training according to the evaluation result to determine whether to change the power consumption evaluation network,
  wherein the power consumption evaluation network includes a plurality of layers, and each of the plurality of layers is selected from a plurality of network component candidates, and
  wherein in changing the power consumption evaluation network, either a layer number is changed or a different network component candidate is selected.

2. The adaptive learning power modeling method according to claim 1, wherein, the parameter range is input, specified or changed by the user.

3. The adaptive learning power modeling method according to claim 1, wherein, the evaluation result comprises an accuracy relevant to an error between the actual power consumption and the predictive power consumption of the to-be-measured circuit.

4. The adaptive learning power modeling method according to claim 3, wherein, the evaluation result comprises a complexity.

5. The adaptive learning power modeling method according to claim 4, wherein, based on the evaluation result, if a tradeoff between the accuracy and the complexity is not achieved, or, the accuracy has not reached an accuracy standard, or, the complexity has not reached a complexity standard, then the power consumption evaluation network is changed by changing the at least one parameter, or selecting other network components from the network components.

6. The adaptive learning power modeling method according to claim 1, wherein, the network components is stored in a non-transitory computer readable medium, and the at least one of the network components is read or sampled from the non-transitory computer readable medium to form the power consumption evaluation network.

7. The adaptive learning power modeling method according to claim 1, wherein, the network components comprise an LSTM network.

8. The adaptive learning power modeling method according to claim 1, wherein, the network components comprise a network formed through combination of the LSTM network and a maxout unit.

9. The adaptive learning power modeling method according to claim 1, wherein, the network components comprise a dilated causal convolution network.

10. The adaptive learning power modeling method according to claim 1, wherein, the network components comprise a temporal convolution network.

11. An adaptive learning power modeling system configured to evaluate a predictive power consumption of a to-be-measured circuit, the adaptive learning power modeling system comprising:
  a controller formed of hardware or firmware, the controller being configured to:
  sample at least one of a plurality of network components to form a power consumption evaluation network according to at least one parameter within a parameter range;
  evaluate the predictive power consumption of the to-be-measured circuit by the power consumption evaluation network;
  train and evaluate an actual power consumption and the predictive power consumption of the to-be-measured circuit to obtain an evaluation result; and
  perform training according to the evaluation result to determine whether to change the power consumption evaluation network,
  wherein the power consumption evaluation network includes a plurality of layers, and each of the plurality of layers is selected from a plurality of network component candidates, and
  wherein in changing the power consumption evaluation network, either a layer number is changed or a different network component candidate is selected.

12. The adaptive learning power modeling system according to claim 11, wherein, the parameter range is input, specified or changed by the user.

13. The adaptive learning power modeling system according to claim 11, wherein, the evaluation result comprises an accuracy relevant to an error between the actual power consumption and the predictive power consumption of the to-be-measured circuit.

14. The adaptive learning power modeling system according to claim 13, wherein, the evaluation result comprises a complexity.

15. The adaptive learning power modeling system according to claim 14, wherein, based on the evaluation result, if the controller does not obtain a tradeoff between the accuracy and the complexity, or, the accuracy has not reached an accuracy standard, or, the complexity has not reached a complexity standard, then the power consumption evaluation network is changed by changing the at least one parameter, or selecting other network components from the network components.

16. The adaptive learning power modeling system according to claim 11, wherein, the network components is stored in a non-transitory computer readable medium, and the at least one of the network components is read or sampled by the controller to form the power consumption evaluation network.

17. The adaptive learning power modeling system according to claim 11, wherein, the network components comprise an LSTM network.

18. The adaptive learning power modeling system according to claim 11, wherein, the network components comprise a network formed through combination of the LSTM network and a maxout unit.

19. The adaptive learning power modeling system according to claim 11, wherein, the network components comprise a dilated causal convolution network.

20. The adaptive learning power modeling system according to claim 11, wherein, the network components comprise a temporal convolution network.

* * * * *